United States Patent [19]

Nagashima et al.

[11] Patent Number: 5,249,061
[45] Date of Patent: Sep. 28, 1993

[54] COLOR IMAGE PRINTER WITH ADAPTIVE COLOR PROCESS

[75] Inventors: Yoshitake Nagashima, Chigasaki; Hisashi Ishikawa, Saitama, both of Japan

[73] Assignee: Canon Kabushiki Kaisha, Tokyo, Japan

[21] Appl. No.: 808,634

[22] Filed: Dec. 17, 1991

[30] Foreign Application Priority Data

Dec. 21, 1990 [JP] Japan .................. 2-405055

[51] Int. Cl.⁵ .................. H04N 1/21; H04N 1/23; H04N 1/46
[52] U.S. Cl. .................. 358/296; 358/444; 358/500
[58] Field of Search .................. 358/75, 300, 296, 450, 358/467, 470, 404, 444; 346/157; 395/114, 117, 115, 116

[56] References Cited

U.S. PATENT DOCUMENTS

| | | | |
|---|---|---|---|
| 4,587,536 | 5/1986 | Saito et al. | 346/157 |
| 4,953,012 | 8/1990 | Abe | 358/75 |
| 4,963,898 | 10/1990 | Kadowaki | 346/157 |

Primary Examiner—Edward L. Coles, Sr.
Assistant Examiner—Scott A. Rogers
Attorney, Agent, or Firm—Fitzpatrick, Cella, Harper & Scinto

[57] ABSTRACT

An image recording control apparatus analyzes color image data outputted by a host computer and determines whether image data of each recording color component of a printing device is present. If there is a color component for which image data is not present, an image recording process based upon this color component is skipped. As a result, a meaningless recording process is no longer performed even if the side transmitting the recording data does not apply special processing to the recording data about to be transmitted.

14 Claims, 7 Drawing Sheets

| MODE | M | C | Y | K | PROCESS |
|---|---|---|---|---|---|
| 1 | 1 | 0 | 0 | 0 | M |
| 2 | 0 | 1 | 0 | 0 | C |
| 3 | 0 | 0 | 1 | 0 | Y |
| 4 | 0 | 0 | 0 | 1 | K |
| 5 | 1 | 1 | 0 | 0 | M, C |
| 6 | 0 | 1 | 1 | 0 | C, Y |
| 7 | 0 | 0 | 1 | 1 | Y, K |
| 8 | 1 | 0 | 1 | 0 | M, Y |
| 9 | 1 | 0 | 0 | 1 | M, K |
| 10 | 0 | 1 | 0 | 1 | C, K |
| 11 | 1 | 1 | 1 | 0 | M, C, Y |
| 12 | 1 | 1 | 0 | 1 | M, C, K |
| 13 | 1 | 0 | 1 | 1 | M, Y, K |
| 14 | 0 | 1 | 1 | 1 | C, Y, K |
| 15 | 1 | 1 | 1 | 1 | M, C, Y, K |

COLOR IMAGE PRINTER WITH ADAPTIVE COLOR PROCESS

BACKGROUND OF THE INVENTION

This invention relates to an image recording control apparatus for controlling the recording processing of a color printer.

In ordinary color printers, a color image is reproduced by combining dyes or pigments of three color components Y (yellow), M (magenta) and C (cyan) or four color components, which includes the color component K (black).

In an example of a recording process for achieving this, images of the individual color components are superimposed on a single sheet of recording paper one at a time in accordance with a predetermined sequence to record the images. For example, in case of a color printer which performs image recording in the three color components, the image of the M-color component is recorded on the recording paper first, then the image of the C-color component is superimposed on the first image, and finally the image of the Y-color component is superimposed on that of the C-color component. In an apparatus which performs the image recording operation in four color components inclusive of K (black), the image of the K-color component is superimposed on that of the Y-color component.

Since the image recording operation is carried out through the three or four steps described above regardless of the contents of the inputted image data, there are occasions when meaningless recording processing, namely processing which does not require a certain recording step, is executed The result is a slow-down in recording speed.

Accordingly, an arrangement has been contemplated in which the application program itself which operates in the host computer is made to control the printer in consideration of this point. However, this increases the burden upon the application programmer.

SUMMARY OF THE INVENTION

An object of the present invention is to provide an image recording control apparatus whereby execution of a meaningless recording process can be eliminated even if the side sending the recording data does not apply special processing to the recording data about to be sent.

According to the present invention, the foregoing object is attained by providing an image recording control apparatus for controlling a recording device which records a color image through a process wherein images of a plurality of recording color components are superimposed and recorded on a recording medium, comprising control means for analyzing input data, detecting absence or presence of data of each recording color component, and controlling a recording process of the recording device based upon results of detection.

Another object of the present invention is to provide an image recording control method whereby execution of a meaningless recording process can be eliminated even if the side sending the recording data does not apply special processing to the recording data about to be sent.

According to the present invention, the foregoing object is attained by providing an image recording control method for controlling a recording device which records a color image through a process wherein images of a plurality of recording color components are superimposed and recorded on a recording medium, comprising the steps of analyzing input data, detecting absence or presence of data of each recording color component, and controlling a recording process of the recording device based upon results of detection.

A further object of the present invention is to provide an image recording control apparatus in which execution of a meaningless recording process can be eliminated even if the side sending the recording data does not apply special processing to the recording data about to be sent, and in which it is possible to perform the recording of images at high speed.

According to the present invention, the foregoing object is attained by providing an image recording control apparatus for controlling a recording device which records a color image through a process wherein images of a plurality of recording color components are superimposed and recorded on a recording medium, comprising input means for inputting recording data, a plurality of memories for storing image data of each recording color component recorded by the recording device, analyzing means for analyzing the recording data inputted by the input means, developing means for developing images, which are based upon results of analysis performed by the analyzing means, in corresponding ones of the memories, memory means for storing the absence or presence of the recording color components used in a predetermined recording area based upon results of analysis performed by the analyzing means, and control means for controlling a recording process of each recording color component of the recording device in accordance with information stored by the memory means.

According to yet another aspect of the present invention, there is provided an image recording control apparatus for controlling a recording device which records a color image through a process wherein images of a plurality of recording color components are superimposed and recorded on a recording medium, comprising input means for inputting recording data;, analyzing means for analyzing RGB color components contained in inputted recording data, memory means for storing a predetermined amount of image data of each of the RGB color components analyzed by the analyzing means, detecting means for detecting the recording color components contained in the image data stored in the memory means, color-information memory means for storing, for each predetermined amount of the recording data, information detected by the detecting means, converting means for reading the image data stored in the memory means and converting it into data of each of the recording color components, and control means for controlling a recording process of each recording color component of the recording device which is based upon the data of each of the recording color components resulting from the conversion performed by the converting means.

Another object of the present invention is to provide a new image control apparatus which is suitable to process a PDL language command.

Another object of the present invention is to provide a new image control apparatus which is suitable to process a color PDL language command.

Other features and advantages of the present invention will be apparent from the following description taken in conjunction with the accompanying drawings,

DESCRIPTION OF THE PREFERRED EMBODIMENTS

Preferred embodiments of the present invention will now be described in detail with reference to the accompanying drawings. In these embodiments, an example is described in which the image recording control apparatus of the present invention is incorporated in a system for recording color images by executing four processes, namely a color-page printer apparatus for superimposing and recording images in each of four color components.

Figure 5:
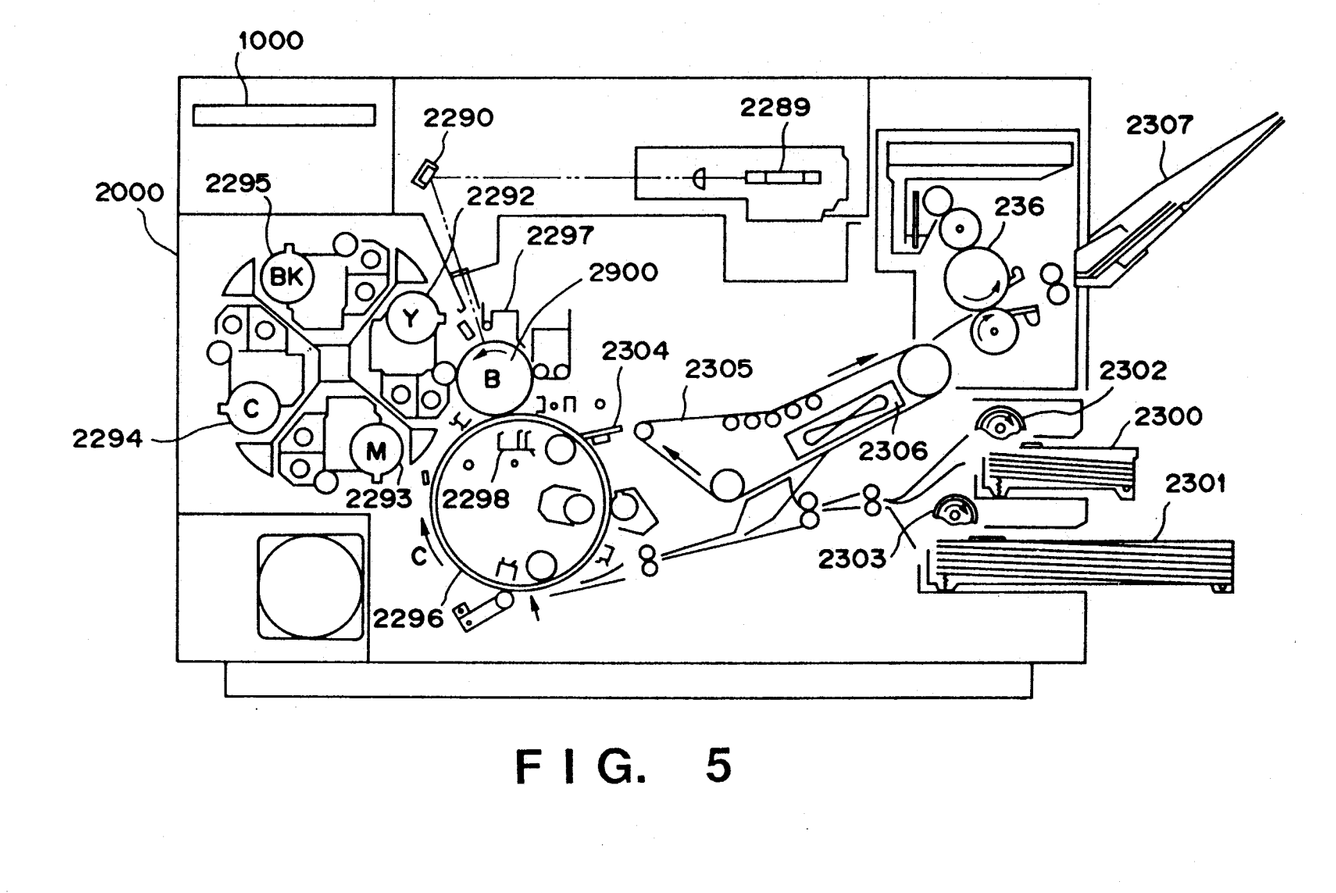
FIG. 5 is a sectional structural view showing a color image recording apparatus in this embodiment.

FIG. 5 is a structural sectional view illustrating a control printer according to an embodiment of the invention.

The color printer according to this embodiment is shown at numeral 2000 in FIG. 5 and includes a control unit 1000 in which various circuits are installed, especially a CPU for administering overall control of the apparatus, and a printer engine comprising various units, described below.

The control unit 1000 outputs an image signal (a video signal) of the M color component to the printer engine. The latter receives this signal and drives a semiconductor laser element, which is not shown. As a result, a laser beam is generated in conformity with the ON/OFF state of the video signal. The generated laser beam is reflected by one side face of a polygon mirror 2289 rotating at a constant speed, whereby the laser beam is swept back and forth (in a direction perpendicular to the plane of the drawing). Next, the laser beam is directed by a reflecting mirror 2290 toward a photosensitive drum 2900 rotating at a constant speed, whereby the surface of the photosensitive drum 2900 is scanned and exposed. The photosensitive drum 2900 is electrified by an electrifying device 2297 and is rotated in the direction of arrow B by a motor, which is not shown. Accordingly, a two-dimensional electrostatic latent image is formed on the photosensitive drum 2900 as a result of being scanned and exposed by the laser beam.

Before the above-described processing for the formation of the electrostatic latent image, the control unit 1000 rotates a developing unit to bring a developing device 2293 into contact with the photosensitive drum 2900 in order to develop the image of the M color component, and rotates a paper feeding roller 2302 to convey a sheet of recording paper from a recording-paper cassette 2300 (or 2301) to a transfer drum 2296 within the apparatus. In the state shown in FIG. 5, a developing device 2292 for the Y component is in contact with the photosensitive drum 2900. The transfer drum 2296 is electrified by an electrifying device 2298. Owing to the action of static electricity, the recording paper conveyed to the electrifying device 2298 is attracted to the device.

The electrostatic latent image on the photosensitive drum 2900 is developed by the developing device 2293, and the developed image is transferred to the sheet of recording paper wound about the transfer drum 2296.

From this point onward, the recording paper on the transfer drum 2296, namely the recording paper to which the image of the M component has been transferred, is subjected to similar processing for the components C, Y and K (black) to form a color image made up of the four superimposed colors.

When the image of the four superimposed colors has thus been formed on the recording paper clinging to the transfer drum 2296, a strip-off device 2304 is brought into contact with the transfer drum 2296 at a prescribed timing to strip the recording paper from the transfer drum 2296 and place it on a conveyor belt 2305. The latter has a surface provided with a multiplicity of holes and the sheet of recording paper conveyed by the belt 2305 is attracted to it by the action of a fan 2306. The conveyor belt 2305 circulates in the direction of the arrow and therefore conveys the recording paper to a fixing roller 236. The arrangement is such that the recording paper will no longer be acted upon by the attracting effect of the fan 2306 at a point just in front of the fixing roller 236. As a result, the recording paper separates from the conveyor belt 2305 and is ejected into an external tray 2307 via the fixing roller 236.

This completes the formation of a color image obtained by the superimposed recording of images of four color components.

Figure 1:
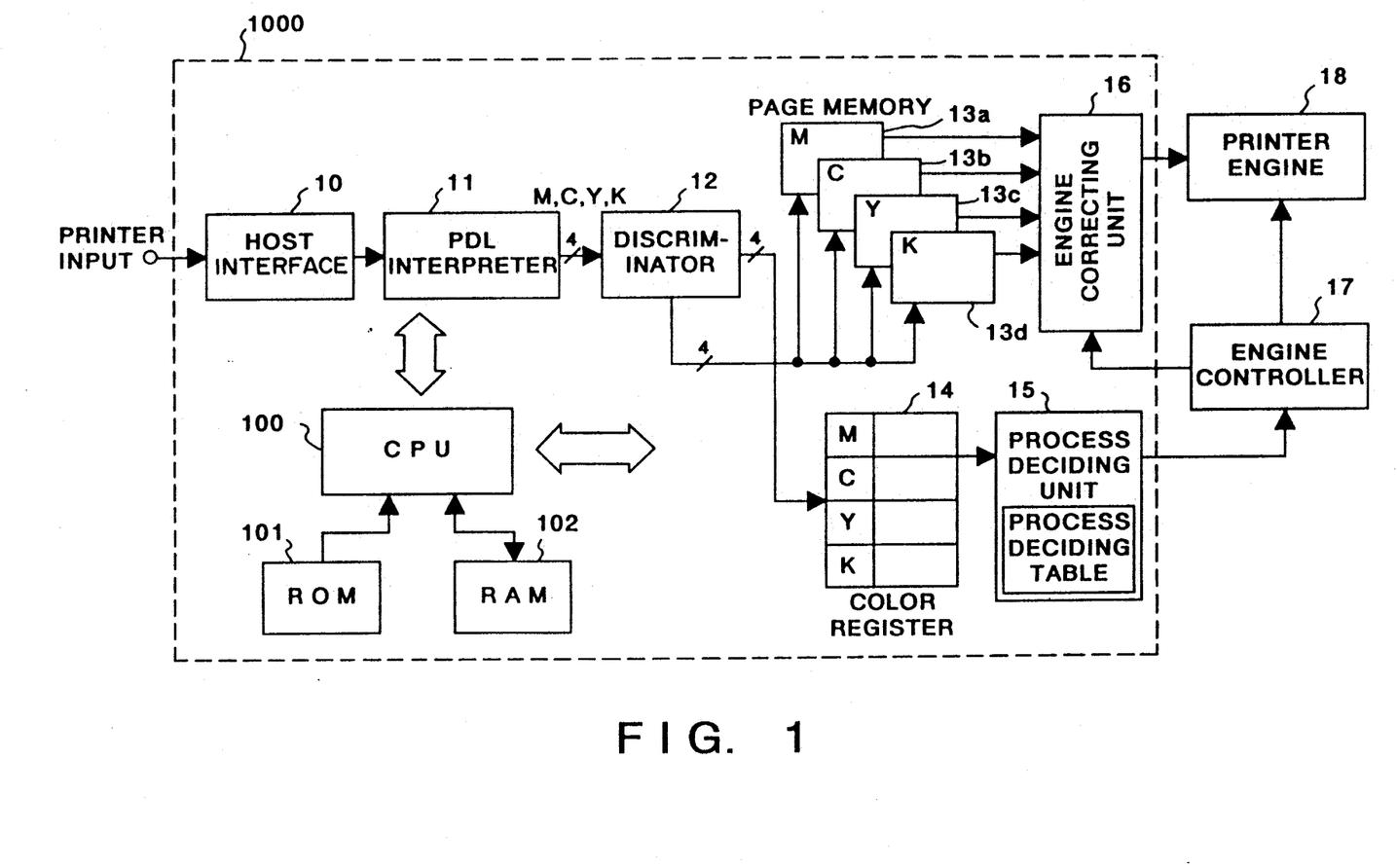
FIG. 1 is a block diagram illustrating a color printing system according to an embodiment of the present invention.

FIG. 1 is a block diagram illustrating the color printer of this embodiment in electrical terms.

As shown in FIG. 1, the control unit 1000 includes a CPU for administering overall control of the apparatus, a ROM storing the processing procedure executed by the CPU, a RAM used as the working area of the CPU, and other components described below.

The components constituting the apparatus will now be described along with their operation.

Compressed printing data sent from a host computer enters a host interface 10 via a printer input terminal. The applied printing data is expanded by a page description language (hereinafter referred to as "PDL") interpreter 11 so as to be restored to the original data. Though the structure of the data based upon PDL is not discussed in detail here, the data is instructive data which, by way of example, commands that lines in the color red should be drawn at certain positions, that characters having an N-point size should be printed at certain positions and in certain colors, etc. Accordingly, if this PDL is interpreted, the output color of this data or of subsequent data can be judged.

The data structure, i.e., the MCYK sequence, of the restored data is preset. Therefore, bit images corresponding to page memories 13a-13d of the respective M, C, Y, K color components are expanded or drawn by a discriminator 12 in the sequence received. If, at this time, the data of a certain color component is significant, the corresponding bit in a color register 14 is set to "1". The term "significant" as used here refers to whether or not there is a need to execute a development process. Data that is "significant" means the existence of printing data. Simply put, if a bit image is to be expanded or drawn in the page memory 13a of the M color component, the bit at the position corresponding to "M" in the color register 14 is made "1". It should be noted that techniques for converting given RGB data into YMC data and techniques for obtaining the K component from these results by UCR (under-color removal) processing are well known and need not be described here.

The details of operation will now be described with reference to the flowchart of FIG. 2.

First, at step S21, the entirety of the data in the color register 14 is reset to "0" and the data in each of the page memories is cleared to "0". Next, at step S22, the received data is interpreted by the PDL interpreter 11. This is followed by step S23, at which it is discriminated in which of the M, C, Y, K color-component page memories the data is to be written. Then, at step S24, the bit of the color register 14 corresponding to the page memory of the color component in which the data is to be written is set to "1". At step S25, the page memory in which the data is to be written is made active and, based upon the interpreted command, a bit image is developed or a line drawing is painted in the memory rendered active.

The foregoing will now be described in simple terms.

If, as a result of interpreting the printing command data from the host computer, the designated color is red, for example, then the Y and M bits of the color register are set to "1". Only the page memories 13a, 13c are made active (i.e., placed in a writable state), and a character pattern is developed or a line painted based upon the designated data. If the page memories 13a–13d are made to have the same address spaces, then it will be possible to write bit images in a plurality of the memories by a single cycle of painting/developing processing.

Thus, the interpretation of the individual items of printing data, the setting of the bits in the color register 14 and the processing for writing the bit images and line drawings (inclusive of character patterns) in the corresponding page memories are carried out in sequential fashion. This processing is continued until the processing for developing one page of image data ends. The determination as to whether one page has ended entails determining whether data sent from the host computer is a record command (a page-eject command, etc.). This determination processing is executed at step S26. If the result of the determination is that the data is not the record command, namely that this is data to be written in next, the program returns to step S22.

The images to be recorded are thus developed in the page memories 13a–13d. When the image development processing for one page ends, the program proceeds to step S27.

At step S27, the content of the color register 14 is examined and the process deciding unit 15 decides the process relating to actual recording processing.

Figure 3:
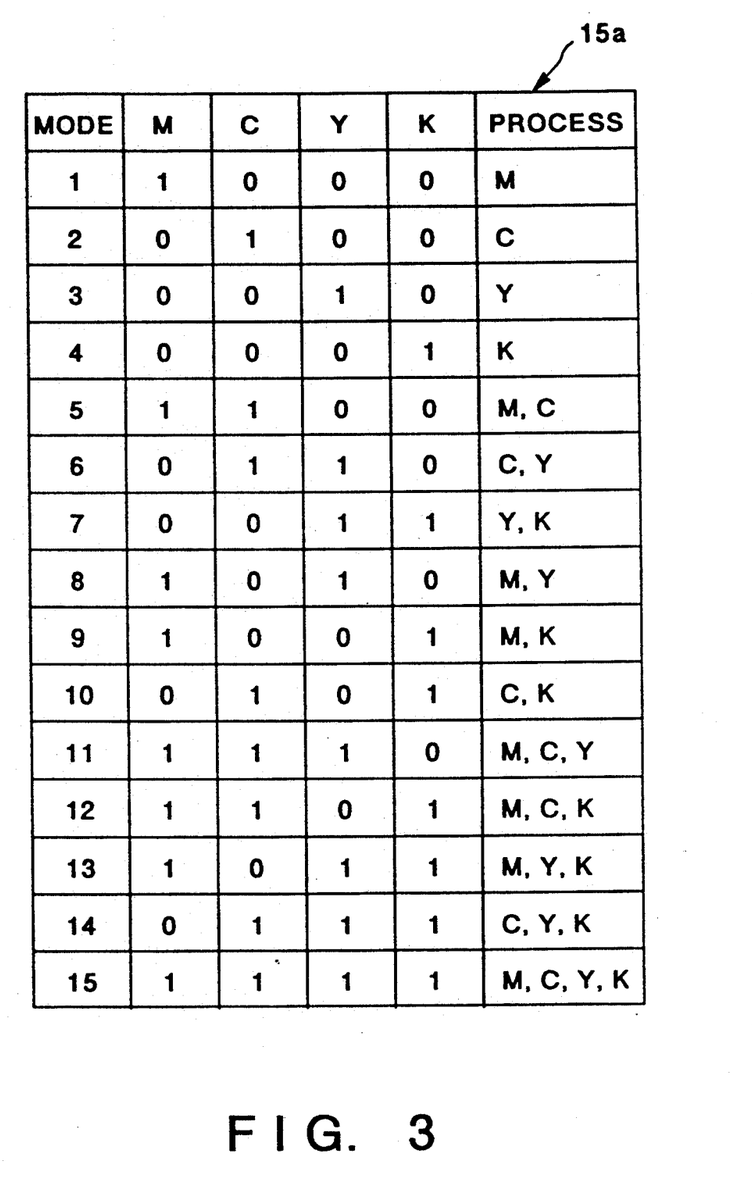
FIG. 3 is a diagram showing the contents of a process deciding table contained in a process deciding unit.

Provided within the process deciding unit 15 is a memory in which a process deciding table 15a of the kind shown in FIG. 3 has been stored in advance. The process deciding unit 15 decides the process in dependence upon the state of each bit in the color register 14. The processes are of modes 1 through 15. For example, if the bit status of the color register 14 is "0, 0, 1, 1" in the order M, C, Y, K, the process decided is mode "7".

Mode "7" means that a bit image is developed solely in the page memories 13c and 13d of the Y and K color components, as will be understood from the processing described above. In other words, mode "7" indicates that the writing of bit images in the page memories 13a, 13b (the memories for the M and C components) has not been performed even once.

Step S27 is followed by step S28, at which the printer engine is driven into operation, and then by step S29, at which actual recording processing is executed in accordance with the process (the mode number) decided.

Figure 2:
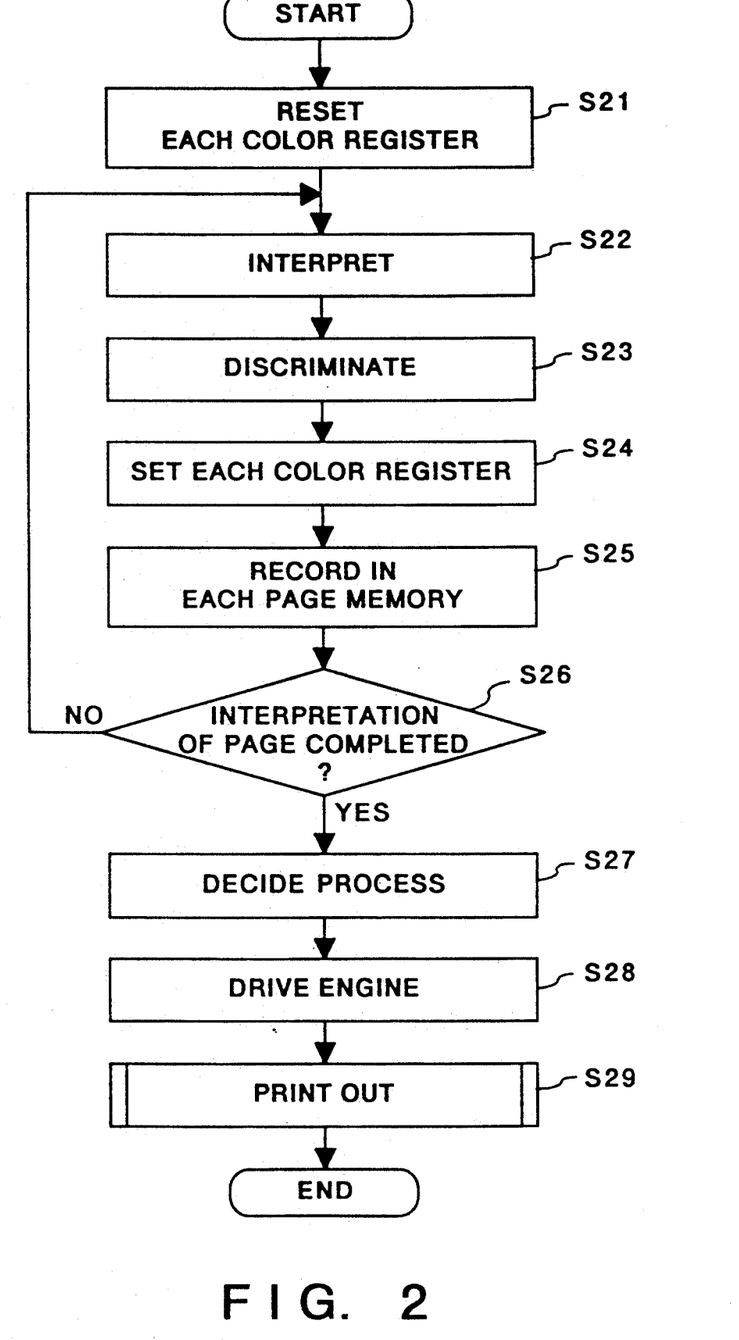
FIG. 2 is a flowchart for describing the operation of the color printing system shown in FIG. 1.
Figure 6A:
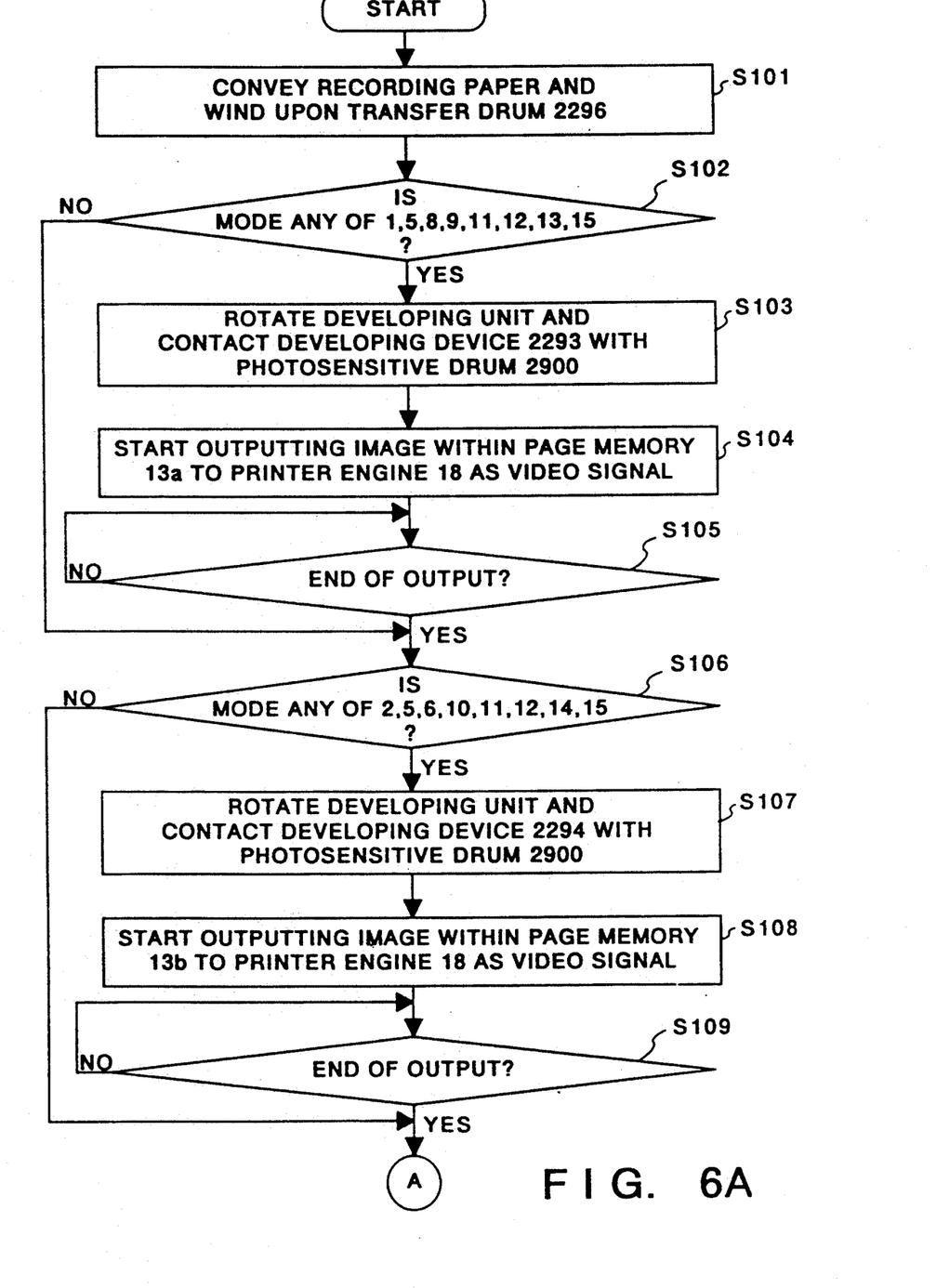
FIGS. 6A and 6B is a flowchart showing the details of a step S29 in the flowchart of FIG. 2.
Figure 6B:
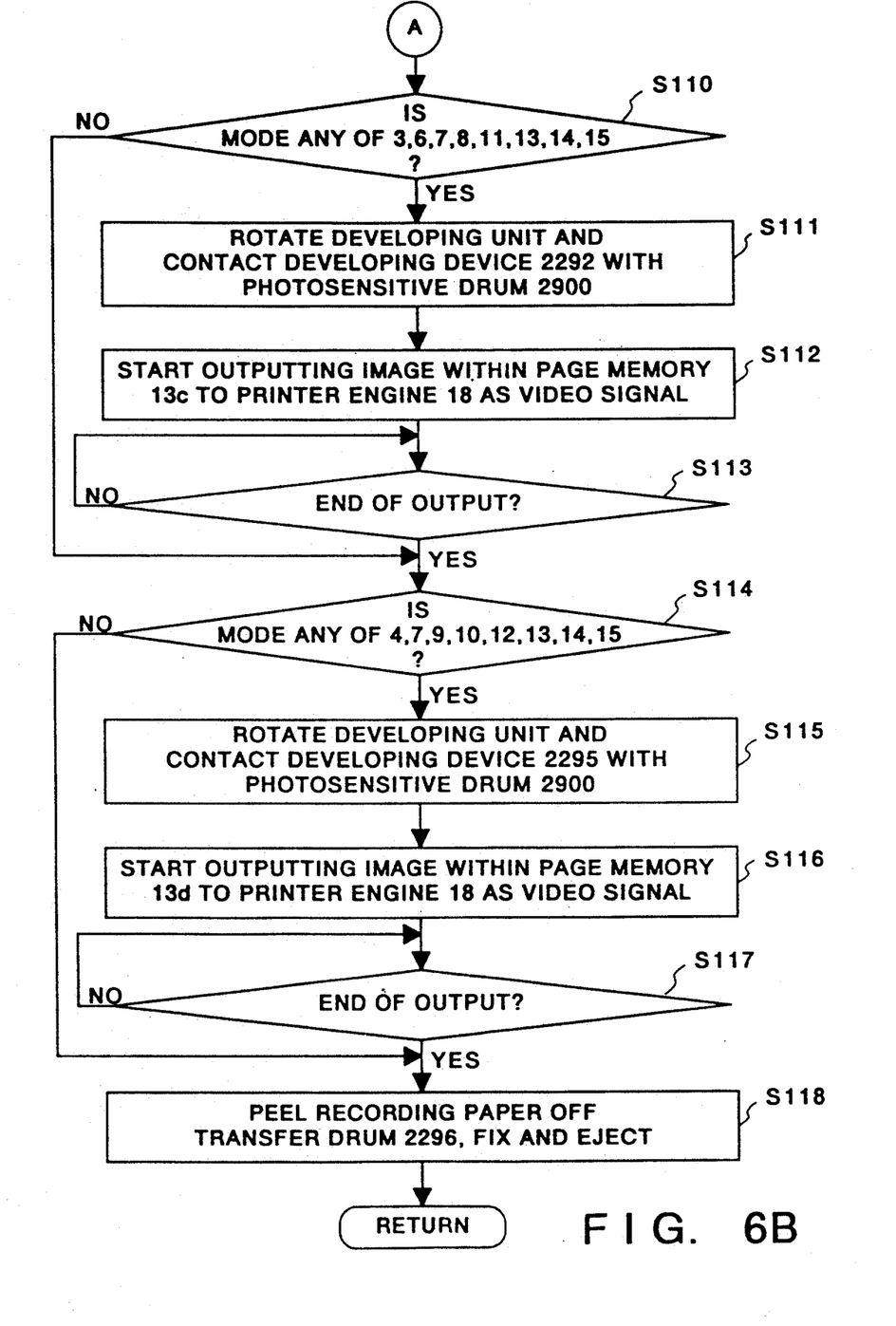

The flowchart of FIG. 6 illustrates the details of the processing executed at step S29 in FIG. 2.

First, at step S101, an engine controller 17 is instructed to convey one sheet of recording paper into the apparatus so that the paper is wound upon the transfer drum 2296. Next, at step S102, it is determined whether the image of interest corresponds to any of modes 1, 5, 8, 9, 11, 12, 13, 15. In other words, it is determined if an M-component bit in the color register 14 has been set to "1". If a "YES" decision is rendered at step S102, then the program proceeds to step S103, at which development processing for the M color component is executed.

At step S103, a control signal is delivered to the engine controller 17 to rotate the developing unit so that the developing device 2293 of the M component is brought into contact with the photosensitive drum 2900. This is followed by step S104, at which the image data in the page memory 13a of the M component starts to be transmitted to the printer engine 18 (or more specifically, a laser driver within the printer engine) as a serial video signal. That is, a horizontal synchronizing signal (a well-known beam detection signal) is sent from the printer engine 18 immediately prior to exposing the photosensitive drum 2900 to one scan of the laser beam. The control apparatus of this embodiment is such that whenever this horizontal synchronizing signal is received, the video signal of one line of image data is transferred serially to the printer engine 18 while being synchronized to a predetermined clock. When the image data is transferred, correction processing such as masking and a gamma correction is executed in an engine correcting unit 16.

It is determined at step S105 whether the transfer of all of the image data of the M component has ended. The system waits until the data transfer ends.

If it is determined at step S102 that the image of interest corresponds to a mode in which recording processing of the M component is skipped, or if it is determined at step S105 that the development processing of one page of image data of the M component has ended, then the program proceeds to step S106.

It is determined at step S106 whether the recording mode of the image of interest is any of the modes 2, 5, 6, 10, 11, 12, 14, 15. More specifically, it is determined whether the bit corresponding to the C component in the color register 14 is "1". If the answer is "YES", steps S107, S108 and S109 are executed. The steps S107–S109 are essentially the same as the steps S103–S105. The only differences are that the developing device 2294 rather than the developing device 2293 is brought into contact with the photosensitive drum 2900, and that the source which generates the outputted video signal is the page memory 13b of the C color component.

If development processing for the C component is thus completed, or if it is determined that the image of interest does not have C-component data, then the program proceeds to step S110.

It is determined at step S110 whether the recording mode of the image of interest is any of 3, 6, 7, 8, 11, 13, 14, 15. In other words, it is determined whether the bit corresponding to the Y component in the color register 14 is "1". If the answer is "YES", then the processing of steps S111, S112 and S113 is executed. The steps S111–S113 are essentially the same as the steps S103–S105. The only differences are that the developing device 2292 rather than the developing device 2293 is brought into contact with the photosensitive drum 2900, and that the source which generates the outputted video signal is the page memory 13c of the Y color component.

If development processing for the Y component is thus completed, or if it is determined that the image of interest does not have Y-component data, then the program proceeds to step S114.

Processing similar to that of steps S102–S105 is performed with regard to the K (black) component.

First, it is determined at step S114 whether the recording mode of the image of interest is any of 4, 7, 9, 10, 12, 13, 14, 15. In other words, it is determined whether the bit corresponding to the K component in the color register 14 is "1". If the answer is "YES", then the processing of steps S115, S116 and S117 is executed. Here the developing device 2292 is brought into contact with the photosensitive drum 2900, and the image in the page memory 13d is outputted to the printer engine 18 as the video signal.

If it is determined that output processing (development processing for the K component) of one page of the image data of the K component has ended, or if it is determined that the image of interest does not have K-component data to be recorded, then the program proceeds to step S118.

At step S118, a signal for driving the stripping device is outputted, whereby the sheet of recording paper that has been subjected to development processing is stripped from the transfer drum 2304. As a result, the sheet of recording paper is conveyed to the fixing roller 236 along the conveyor belt 2305. The recording paper is fixed by the fixing roller 236 and is then ejected into the tray 2307.

If stated in simpler terms, the foregoing processing is as follows: First it is determined whether an image about to be recorded has data of a color component to be recorded. Development processing found to be meaningless as a result of this determination is skipped. For example, if, in this embodiment, only the bit of the K component in the color register 14 is "1" and the other bits are all "0", then the mode is mode "4" and the printer engine 18 is made to activate only the K process. Recording is ended by one pass, and the throughput is raised four-fold in comparison with the usual case (mode 15). It should be noted that an arrangement may be adopted in which once images have been developed in the page memories 13a–13d, the contents of these memories are investigated and a determination is made as to whether a pixel (bit) that has been set to "1" exists. However, if it is so arranged that a determination is made, prior to development of the image, as to which memory the data will be written in when the inputted data is interpreted, as in the above-described embodiment, then processing for investigating the contents of each memory one at a time can be eliminated. This will make it possible to achieve a commensurate speed-up in processing.

Second embodiment of the invention will now be described with reference to FIG. 4.

Figure 4:
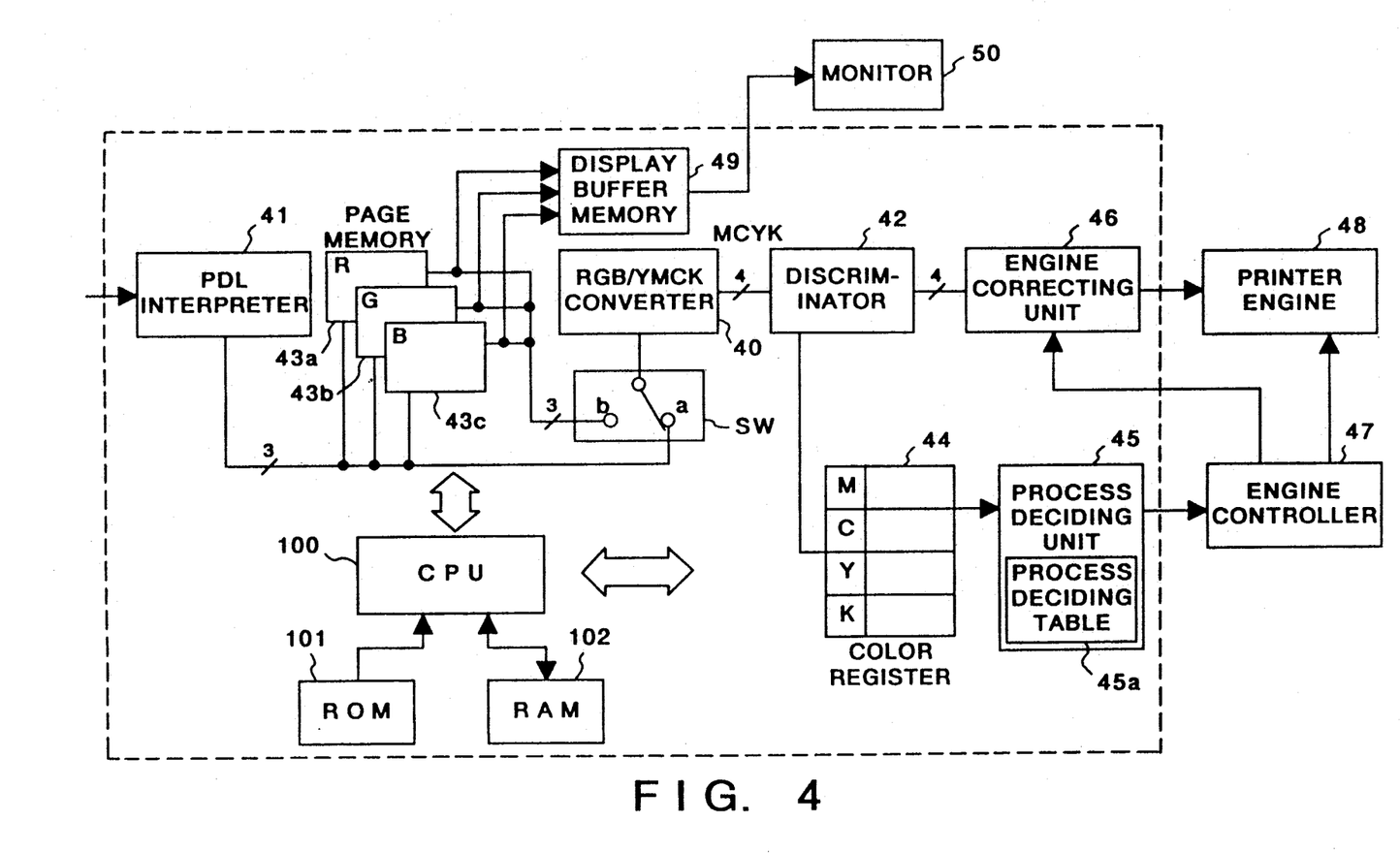
FIG. 4 is a block diagram illustrating a color printing apparatus according to another embodiment of the present invention.

In FIG. 4, page memories 43a–43c have identical address spaces. Based upon inputted data, a PDL interpreter 41 activates the corresponding page memory to develop the designated image or describe a line drawing. At this time, a switch sw is connected to an a side so that an RGB/YMCK converter 40 may monitor which of the page memories 43a–43c has been activated.

For example, when a line of the color yellow is to be described, the PDL interpreter 41 simultaneously activates the R-component page memory 43a and the G-component page memory 43b so that the line is painted. Since the page memories have the same address space, the writing of data in the corresponding page memory is completed by a single painting processing operation. The RGB/YMCK converter 40 (constituted by a ROM or the like storing a look-up table) monitors which of the page memories has been activated. In a case where the R- and G-component page memories have been activated, as mentioned above, the RGB/YMCK converter 40 determines that recording based on the Y component is to take place and outputs the corresponding signal to a discriminator 42. In a case where the switch sw has been connected to the a side, the inputted signal is delivered to a color register 44, which the corresponding bit is set. In the example set forth above, the bit of the Y component in the color register 14 is set to "1".

When one page of RGB printing data has been outputted from the host computer, the image based upon this data is developed or painted in the page memories 43a–43c. Accordingly, if the contents of the color register 44 are observed, it becomes obvious which recording colors are present. In other words, the mode in the first embodiment described earlier becomes clear.

When the mode has been decided, development processing in accordance with the flowchart of FIG. 6 is executed. In significant development processing, the items of data in page memories 43a–43c are read simultaneously. The reason for this is that the conversion from RGB to YMCK requires all of the RGB status information. For example, in case of mode "5", only the development processing of the recording color components M, C is performed, but the RGB images are read simultaneously in the respective development processing operations. A CPU 100 is aware of the color currently being developed and therefore controls the discriminator 42 in such a manner that it will provide a printer engine 48 solely with the signal of the color component being developed, this signal being outputted by the RGB/YMCK converter 40. When the video signal of the developed color component is outputted to the printer engine 48, correction processing such as masking and a gamma correction is executed in an engine correcting unit 46. This is the same as in the first embodiment.

In FIG. 4, numeral 49 denotes display buffer memory which receives and stores the image data transmitted from the page memories 43a–43c. Numeral 50 denotes a monitor for displaying image to be printed, which has been stored in the display buffer memory 49. Generally, a monitor converts RGB data to a visible image on screen. Accordingly, as shown in FIG. 4, the image data is displayed as a visible image by only transmitting the image data stored in the page memory to the display buffer memory 49 without alteration.

By virtue of the foregoing processing, only a significant process in the YMCK processes is executed even if the inputted data is data based upon RGB.

Accordingly, when a print instruction is received owing to an operation performed by the operator, the application program run by the host computer need only perform simple processing, which is to provide the printer with an output of information painted/edited thus far. As a result, recording can be performed at the maximum speed corresponding to the content of the data about to be printed. Moreover, since a conversion is first made into the images of the R, G, B color components, recording can be realized using one memory less than the four memories of the recording color components Y, M, C, K.

L*a*b*, L*u*v, YIQ are available as spaces representing colors. In a case where such information is inputted to record a color image, this can be applied with PDL. Therefore, there is a circuit for converting the inputted color-space data into RGB is provided in the PDL interpreter 41 of FIG. 4 in such a case. Accordingly, an input can be applied to a video camera or various video-input devices, not just a host computer. In other words, the input data may be either digital or analog data.

In the foregoing embodiments, the printing control apparatus of the present invention is provided within a color printer. However, it is equally permissible to provide the apparatus between a device serving as a source of image data and a color printer. In such case, it will suffice to adopt an arrangement in which once the process mode has been decided and the development process to be skipped has been made clear, the recording image of this portion is not outputted to the printer but a designating signal or control signal for controlling the developing unit is delivered to the printer instead.

Furthermore, it is permissible for the printing control apparatus of the invention to be provided within the host computer. In other words, the apparatus may be interposed between the application program run in the host computer and the printer interface of the host computer to realize the above-described processing. Briefly, the application program would interpret the arriving raw printing data, apply the above-described optimization processing and then output the data to the printer via the printer interface.

The foregoing embodiments have been described taking a laser-beam printer as an example of a color printer. However, this does not impose a limitation upon the present invention. Printers which may be used include those of the ink-jet, dot-impact and thermal-transfer types. In addition, the printer need not be a page printer. The printer can be one having a mechanism in which a carriage with a mounted recording head is reciprocated to the left and right to record images. It would suffice for the above-described processing to be executed for every image recorded by a single cycle of carriage movement.

As many apparently widely different embodiments of the present invention can be made without departing from the spirit and scope thereof, it is to be understood that the invention is not limited to the specific embodiments thereof except as defined in the appended claims.

What is claimed is:

1. An image recording apparatus comprising:
   input means for inputting description command of page description language;
   developing means for generating color image data based upon the description command and for developing the color image data into a color memory;
   means for storing kind of color of the color image data for a predetermined area, while said developing means is developing the color image data based upon the description command; and
   control means for controlling a recording process of the recording device in accordance with the kind of color stored by said storing means.

2. The apparatus according to claim 1, wherein said recording device is comprised by a color printer for superimposing and recording images of respective recording color components in predetermined area units; said control means performing control, in dependence upon the kind of color stored by said storing means, so as to skip a recording process of an unused recording color component.

3. The apparatus according to claim 2, wherein said predetermined area unit is a page unit.

4. An image recording control method for controlling a recording device which records a color image through a process wherein images of a plurality of recording color components are superimposed and recorded on a recording medium, comprising the steps of:
   inputting description command of page description language;
   generating color image data based upon inputted description command and developing the color image data;
   storing kind of color of the color image data for a predetermined area while the color image data based upon the description command is being developed; and
   controlling recording process of a recording device in accordance with kind of color stored.

5. The method according to claim 4, wherein said recording device is comprised by a color printer for superimposing and recording images of respective recording color components in predetermined area units.

6. The method according to claim 5, wherein said description command is inputted in page units.

7. An image recording control apparatus for controlling a recording device which records a color image by a page through a process wherein images of a plurality of recording color components are superimposed and recorded on a recording medium, comprising:
   input means for inputting description command of a page description language;
   a plurality of memories for storing image data of each recording color component recorded by said recording device;
   analyzing means for analyzing a color represented by the description command inputted by said input means;
   developing means for developing images in a particular one of said memories based on results of analysis performed by said analyzing means;
   storing means for storing the absence or presence of the recording color components used in the page to be recorded while said analyzing means is analyzing the description command; and
   control means for controlling a recording process of each recording color component of the recording device in accordance with information stored by said storing means.

8. The apparatus according to claim 7, wherein said recording device is comprised by a color printer for superimposing and recording images of respective recording color components in predetermined area units.

9. The apparatus according to claim 8, wherein said predetermined area unit is a page unit.

10. An image recording control apparatus for controlling a recording device which records a color image by a page through a process wherein images of a plurality of recording color components are superimposed and recorded on a recording medium, comprising:
   input means for inputting description command;
   memory means for storing image data of each of plural color components for one page;
   means for generating color image data based upon the description command and for developing the color image data into said memory means;
   detecting means for detecting the recording color components contained in the image data stored in said memory means;
   information storing means for storing information detected by said detecting means when said memory means stores image data;
   converting means for reading the image data stored in said memory means and for converting it into data of each of the recording color components; and
   control means for controlling a recording process of each recording color component of said recording device in accordance with the information stored in the information storing means.

11. The apparatus according to claim 10, wherein said recording device is comprised by a color printer for superimposing and recording images of respective recording color components in predetermined area units;
   said control means performing control, in dependence upon the information stored by said information storing means, so as to skip a recording process of an unused recording color component.

12. The apparatus according to claim 10, wherein the recording color components are yellow, magenta, cyan and black.

13. An image recording apparatus for control printing process of a recording device, comprising:
   input means for inputting description command of page description language;
   a plurality of memories for storing image data of each color component recorded by said recording device;
   analyzing means for analyzing colors represented by the description command inputted by said input means;
   register means for holding signals indicating of presence of absence of image in each of the memories;
   developing means for developing image in the memories based upon the result of analysis performed by said analyzing means;
   setting means for setting signals into said register means while said developing means is developing image, said signals being for identifying memories in which an image is developed by said developing means; and
   control means for controlling the recording process of said recording device in accordance with contents of said register means when images of one page have been developed in memories.

14. The image recording apparatus according to claim 13, wherein said register means is reset whenever said developing means starts to develop image of one page.

* * * * *

UNITED STATES PATENT AND TRADEMARK OFFICE
CERTIFICATE OF CORRECTION

PATENT NO. : 5,249,061
DATED : September 28, 1993
INVENTOR(S) : Yoshitake Nagashima, et al.

It is certified that error appears in the above-identified patent and that said Letters Patent is hereby corrected as shown below:

<u>COLUMN 12</u>

Line 4, "control" should read --controlling--;
Line 14, "indicating of" should read --indicative of--;
Line 15, "of absence" should read --or absence--; and
Line 30, "image" should read --an image--.

Signed and Sealed this

Thirty-first Day of May, 1994

*Attest:*

BRUCE LEHMAN

*Attesting Officer*        *Commissioner of Patents and Trademarks*